Oct. 9, 1934.   J. W. WHITE   1,975,887
VEHICLE BRAKE
Filed April 6, 1931   2 Sheets-Sheet 1

INVENTOR
John W. White
BY
Whittemore Hulbert
Whittemore Belknap
ATTORNEYS

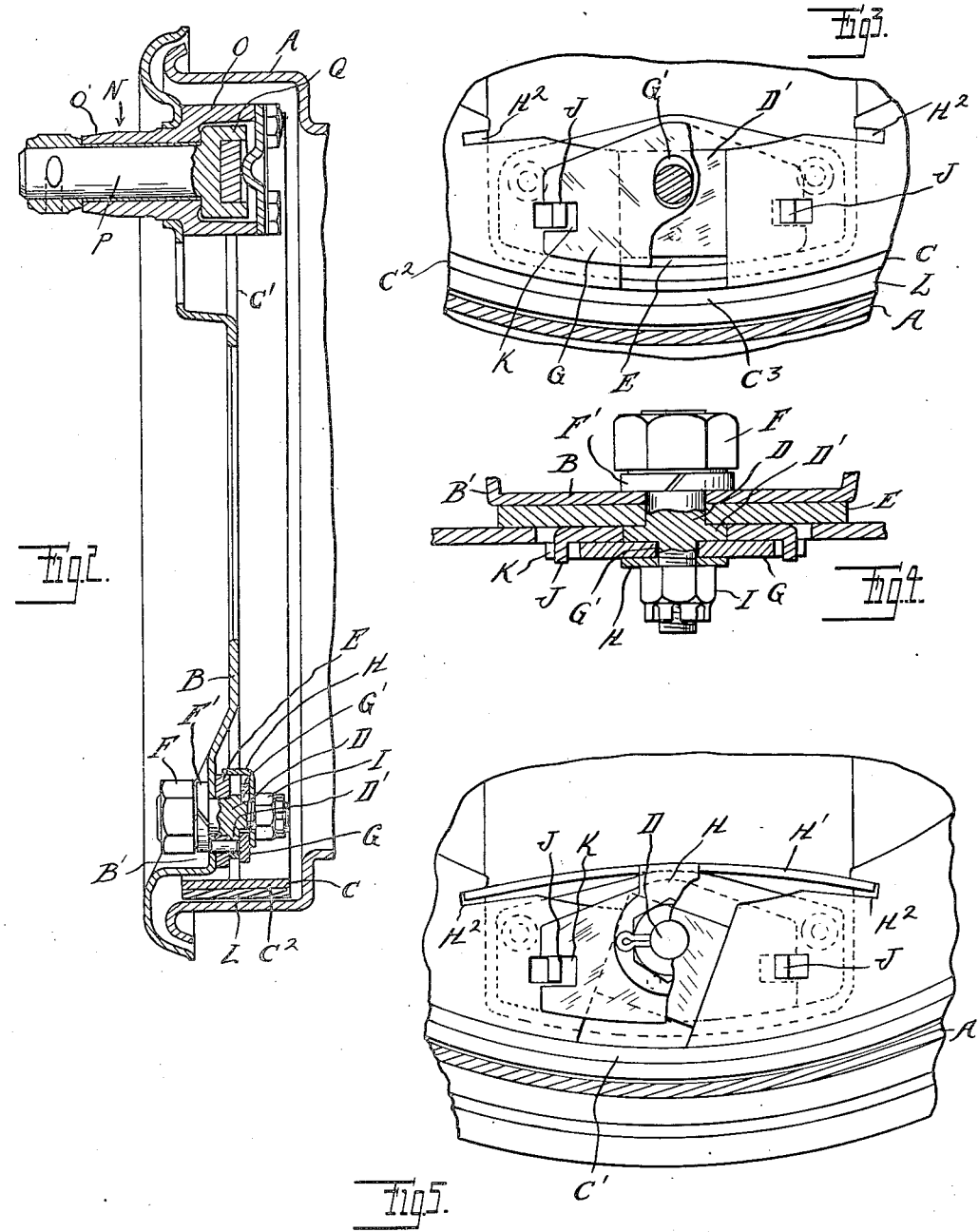

Patented Oct. 9, 1934

1,975,887

UNITED STATES PATENT OFFICE 1,975,887

VEHICLE BRAKE

John William White, Detroit, Mich.

Application April 6, 1931, Serial No. 528,149

11 Claims. (Cl. 188—78)

The invention relates to vehicle brakes of the internal type in which the braking action is effected by the radially outward movement of brake shoes within a brake drum. With such constructions each shoe is pivotally anchored at one end to the brake head and is moved outward at the opposite end by various means, mechanical, hydraulic, etc. Inasmuch however, as the radial movement varies from the maximum at the actuated end to zero at the pivot, it is usually necessary to limit the length of contact by cutting away a segment adjacent to the pivotal point, thereby preventing dragging of the brakes in released position. To the extent of this diminution in the length of the braking segment, the effectiveness of the braking action and the life of the lining is correspondingly diminished.

It is one of the objects of the present invention to obtain a construction in which the entire length of the shoe from the pivotal point to the actuated end is effective for braking action. It is a further object to insure freedom from drag when the brake is released with a minimum of clearance and of lost motion in the actuating mechanism. Still further it is an object to provide for automatic adjustment to compensate for wear in the brake linings, thereby dispensing with the necessity of manual adjustment and also maintaining a constant clearance at all times. With these and various other objects in view the invention consists in the construction as hereinafter set forth.

In the drawings:

Figure 2 is a vertical central section therethrough;

Figure 3 is a sectional elevation of a part of Figure 1;

Figure 4 is a cross section thereof;

Figure 5 is a sectional elevation similar to Figure 3 showing a modified construction.

Figure 1:
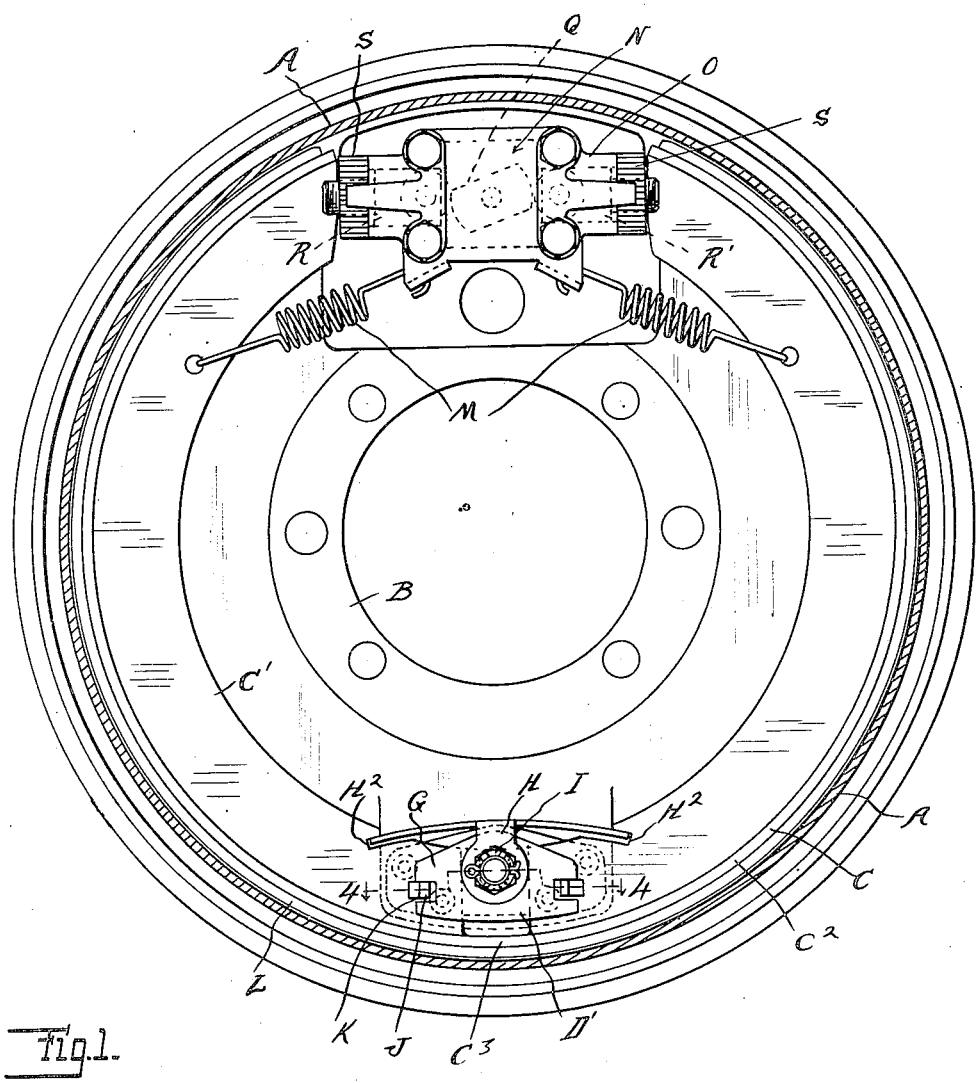
Figure 1 is an elevation of my improved brake.

A is the rotary brake drum, B is the stationary head or brake carrier plate and C is a brake shoe arranged within the drum and pivotally anchored to the plate B. It is usual to provide independent shoes on opposite sides of the brake drum with either a single pivot or two independent pivots for mounting the same on the brake head. Also as previously stated it is usual to terminate the friction lining for the shoe some considerable distance from the pivotal point so as to avoid dragging. With my improved construction I use only a single shoe for braking on opposite sides of the drum and have the friction surface extend continuously from one end to the other of this shoe. The shoe is pivotally anchored centrally between its ends but the construction is such as to permit withdrawal of the portion of the braking surface adjacent to the pivot whenever the brake is released, such construction being as follows:

The body of the shoe is formed of a flanged member preferably of T-shaped cross section with the stem C' of the T constituting a radially inwardly extending flange at the center of the peripheral portion C². Centrally between the ends of the shoe the flange C' is cut away so as to leave a flexible resilient section C³ connecting the more or less rigid sections on opposite sides thereof. The pivot and anchor for the brake is formed by a stud D which is provided with a rectangular portion D' for fitting in the cut away portion of the flange C'. The stud is carried by a reinforcing plate E which is adjacent to the carrier plate or head B and is clamped thereto by a nut F and lock washer F'. The carrier head preferably has an embossed off-set portion B' to which the plate E is secured. G is a plate mounted upon the stud D and extending to overlap the portions of the flange C' upon opposite sides of the cut away portion. This plate is provided with a slot G' permitting radial movement of the plate upon the stud. H is a dished washer upon the stud D and I is a clamping nut engaging a threaded portion of the stud and adapted when tightened to place a predetermined clamping pressure upon the plate G to produce a predetermined friction between said plate and the portion D' of the stud. The function of the plate G is to limit the radial movement of the shoe C upon the anchor stud D and to this end lugs J preferably struck up from portions of the flange C' upon opposite sides of the cut away portion engage slots K in the plate G. The slots K are slightly wider than the lug so as to give a predetermined amount of lost motion, this being sufficient for working clearance between the friction face of the shoe and the drum. The arrangement is such that the amount of radial movement permitted to the shoe at the pivotal point is limited by the clearance of the lugs J in the slot K but under certain conditions hereinafter described the plate G may be moved radially outward on the stud D to compensate for wear.

The shoe C is provided with a friction lining L which preferably extends continuously from end to end. The shoe is also preferably provided with suitable means such as the springs M for retracting it from frictional contact with the drum, the springs being located near the free ends of the shoes but arranged at such an angle that they also withdraw the center portion of the shoe from contact with the drum. If desired, these springs may be supplemented by a spring at the center of the shoe and as shown I have formed this spring by T-shaped extension H' of the washer H. This extension H' has its opposite ends sprung radially outward and engaged with slotted bearings H² in the web or flange C' of the shoe so that the resilient tension will urge the shoe radially inward away from contact with the drum.

With the construction as thus far described, the brake may be actuated by any suitable construction of actuating means but as shown this consists of a mechanical unit N arranged between the free ends of the shoes. The unit comprises a casing O secured to the head or brake carrier B and having a bearing portion O' in which a rock shaft P is journaled. Upon the rock shaft is a cam Q which is adapted to operate two plungers R and R' in opposite directions, the outer ends of said plunger engaging the respective shoes. Adjusting means such as S may be arranged between the ends of the plunger and the shoes to compensate for wear in the brake lining.

In operation the shoe C is normally held in the position concentric with the drum but with its friction lining L slightly spaced from the inner face of the drum sufficient for working clearance. When the brake is applied by the turning of the rock shaft P, the cam Q and plunger R will force the shoe ends oppositely outward and also force the center portion into contact with the drum. Such movement is permitted first by the lost motion afforded through the clearance of the lugs J in the slots K; second, if this lost motion is insufficient, by the outward sliding of the plate G against the frictional resistance of the spring washer H. Thus the entire lining of the shoe will be forced into frictional contact with the inner face of the drum and is effective for braking action. As the brake linings wear, the members S' may be adjusted to compensate therefor, but the adjustment at the center of the shoe in relation to the pivot anchor is automatic, being permitted by the outward sliding of the plate G as just described. The amount of such adjustment is limited only by the length of the slot G' in the plate G and this is sufficient to permit automatic compensation during the entire life of the lining.

It will be noted that the shoe C is comparatively rigid in the portions extending from its opposite ends to the cut away portion of the flange C'. Intermediate these portions, however, the removal of the flange C' permits the peripheral portion C³ to freely flex, thereby producing the desired pivotal action. It is obvious that this specific construction is not essential to the means for automatic adjustment.

In the modified construction as shown in Figure 5, the flange C' is cut away to form a slot with the opposite parallel edges thereof inclined at an angle to the radius of the shoe. The direction of the inclination is such that the torque reaction between the drum and the friction face of the shoe will tend to slide the shoe outward upon the stud D, thereby insuring full braking pressure in the portions adjacent to the pivot as well as at the ends of the shoe.

What I claim as my invention is:

1. The combination with a brake drum, of a shoe therein, a pivot anchor for said shoe permitting radial movement of the latter at the pivotal point, means located at the pivotal point for limiting such radial movement to a predetermined amount, means for retracting the shoe within said limit and means automatically operated by moving said shoe an excess distance radially outward into braking contact with said drum for adjusting said limiting means.

2. The combination with a brake drum, of a pivotal shoe therein having a friction face extending to the pivotal point, a pivot anchor for said shoe permitting radial movement of the shoe thereon, means located at the pivotal point for limiting such radial movement to a predetermined amount, means for retracting said shoe and for moving the same at the pivotal point within said predetermined limit, and means automatically operated by moving the shoe an excess distance to force all portions of its friction face in contact with said drum for adjusting said limiting means.

3. The combination with a brake drum, of a shoe therein extending around on opposite sides of said drum, a friction lining for said shoe extending uninterruptedly from end to end thereof, a pivot anchor for said shoe at a point intermediate its ends permitting radial movement of the shoe thereon, means frictionally engaging said pivot anchor for yieldably limiting the radial movement of the shoe thereon, and means for retracting said shoe and for moving the same radially inward at the pivotal point within the limit of said limiting means, and means for moving the free ends of said shoe in opposite directions to force all portions of the friction lining into braking contact with said drum and to overcome the frictional resistance of said limiting means.

4. The combination with a brake drum, of a shoe extending around within the drum and having comparatively rigid portions on opposite sides thereof and an intermediate flexible portion, a lining for said shoe extending continuously from end to end, a pivot anchor for said shoe engaging the flexible portion thereof and permitting radial movement thereof at the pivotal point, a member engaging said shoe adjacent to the pivotal point for limiting the relative radial movement thereof to a predetermined amount, means for frictionally restraining said member from radial movement, means for retracting said shoe and for moving the same radially inward at the pivotal point within the limit of said limiting member, and means for actuating the free ends of said shoe oppositely to force all portions of said friction lining into braking engagement with the drum and to overcome the frictional resistance to movement of said limiting member.

5. The combination with a brake drum, of a shoe therein extending around on opposite sides of said drum, a continuous friction surface on said shoe from end to end thereof, a pivot anchor for the central portion of said shoe permitting radial movement thereon, means located at the pivotal point for retracting said shoe, means for automatically limiting inward movement of said shoe from said drum to a predetermined amount and means automatically operated by a movement actuating said shoe an excess distance to force all portions of said friction surface into contact with said drum for adjusting said limiting means.

6. The combination with a brake drum, of a brake shoe therein having a peripheral portion and a radially inwardly extending reinforcing flange for imparting comparative rigidity thereto, a portion of said flange at the center of the shoe being cut away to permit flexing, a pivot anchor in the cut away portion engaging the ends of said flange on opposite sides thereof and permitting radial movement, a brake lining extending uninterruptedly from end to end of the peripheral portion of said shoe, a member mounted on said anchor frictionally restrained from radial movement thereon, said member engaging said shoe to restrain radial movement thereof to a predetermined limit, means for actuating said shoe to force all portions of said lining in frictional contact with the drum and to overcome the frictional resistance of said member on said anchor.

7. The combination with a brake drum, of a brake shoe therein having a peripheral portion and a radially inwardly extending reinforcing flange for imparting comparative rigidity thereto, a portion of said flange at the center of the shoe being cut away to permit flexing, an anchor in the cut away portion engaging parallel ends of said flange on opposite sides thereof, a brake lining extending uninterruptedly from end to end of the peripheral portion of said shoe, a member mounted on said anchor frictionally restrained from radial movement thereon, said member extending to overlap said flange on opposite sides of said cut away portion and engaging the same to permit the free radial movement thereof to a predetermined amount, a resilient bar mounted on said anchor extending oppositely therefrom and engaging bearings in the opposite portions of said flange to retract said shoe from said drum within said predetermined limit.

8. The combination with a brake drum, of a shoe within said drum having a peripheral portion and a radially inwardly extending reinforcing flange for imparting comparative rigidity thereto, a portion of said flange at the center of the shoe being cut away to permit flexing, a brake carrier, an anchor stud secured to said brake carrier and extending through said cut away portion of said flange, said stud having a rectangular portion for bearing against the ends of said flange on opposite sides of the cut away portion, a plate mounted on said stud adjacent to said rectangular portion slotted to permit radial movement and extending to overlap the portions of said flange on opposite sides thereof, a lost motion engagement between said plate and flange portions comprising a lug struck out of one engaging an aperture in the other with a clearance to provide a predetermined amount of independent movement, and means for resiliently clamping said plate upon said stud to produce a predetermined friction.

9. The combination with a brake drum, of a brake shoe therein having a peripheral portion and a radially inwardly extending reinforcing flange for imparting comparative rigidity thereto, a portion of said flange at the center of the shoe being cut away to permit flexibility, a brake carrier, an anchor stud on said brake carrier extending through said cut away portion and bearing against the portions of said flange on opposite sides thereof for permitting radial movement, a plate mounted on said stud slotted for radial movement thereon and overlapping the portions of said flange on opposite sides thereof, the lost motion engagement between said plate and said portions permitting a predetermined amount of independent radial movement, a spring washer on said stud, a nut engaging a threaded portion of said stud for tensioning said spring washer to place a predetermined friction between said plate and stud, and a T-shaped extension of said washer bent into a transverse plane and deflected to engage slotted bearings in said flange portion to resiliently urge said shoes inward away from said drum.

10. The combination with a brake drum, of a brake shoe therein having a peripheral portion and a radially inwardly extending reinforcing flange having a cut away portion, an anchor stud for said shoe extending through said cut away portion and permitting radial movement of the shoe thereon, having a T-shaped member mounted on said stud and extending into the plane of said flange, the opposite ends of said T-shaped member being deflected outwardly to place a resilient tension thereon and being engaged with slotted bearings in said flange to normally draw said shoe out of frictional engagement with the drum.

11. The combination with a brake drum, of a shoe within said drum having a peripheral portion and a radially inwardly extending reinforcing flange, a portion of said flange at the center of the shoe being cut away to form a slot with the opposite edges thereof inclined to the radius of the shoe, an anchor stud secured to said brake carrier and extending through said cut away portion to engage the inclined edges thereof, the direction of inclination being such that the torque reaction of the drum on said shoe when the brake is applied will move said shoe outward on said anchor stud.

JOHN WILLIAM WHITE.